(12) United States Patent
Spykerman et al.

(10) Patent No.: US 6,253,943 B1
(45) Date of Patent: Jul. 3, 2001

(54) STORAGE DIVIDER

(75) Inventors: David J. Spykerman, Zeeland; Bradford J. Burrows, West Olive, both of MI (US)

(73) Assignee: Prince Technology Corporation, Holland, MI (US)

(*) Notice: Subject to any disclaimer, the term of this patent is extended or adjusted under 35 U.S.C. 154(b) by 0 days.

(21) Appl. No.: 09/186,960

(22) Filed: Nov. 5, 1998

Related U.S. Application Data

(63) Continuation-in-part of application No. 08/814,653, filed on Mar. 11, 1997.

(51) Int. Cl.$^7$ .................................................. B65D 6/18
(52) U.S. Cl. .................. 220/6; 220/7; 224/539; 224/542
(58) Field of Search .................. 224/40, 542, 539; 220/6, 7, 666; 217/12 R, 13–16, 43, 45, 46–48; 206/751, 754, 577, 600

(56) References Cited

U.S. PATENT DOCUMENTS

| | | |
|---|---|---|
| Re. 30,861 | 2/1982 | Krawagna . |
| 110,991 | 1/1871 | Miller . |
| 728,749 | 5/1903 | McCord . |
| 810,574 | 1/1906 | Sewell . |
| 846,788 | 3/1907 | Friedheim . |
| 1,157,045 | 10/1915 | Risher . |
| 1,202,253 | 10/1916 | Vitt . |
| 1,470,898 | 10/1923 | Webb . |
| 1,484,789 | 2/1924 | Lackey . |
| 1,905,890 | 4/1933 | Blakely . |
| 1,972,483 * | 9/1934 | Hartson ................................. 220/6 |
| 2,049,620 | 8/1936 | Reed et al. . |
| 2,175,949 | 10/1939 | Allen . |
| 2,256,928 | 8/1941 | Black et al. . |
| 2,784,027 | 3/1957 | Temp . |
| 2,867,471 | 1/1959 | Coon, Jr. . |
| 2,898,146 | 8/1959 | Yudenfreund . |
| 3,132,781 | 5/1964 | Poczatek . |
| 3,289,877 | 12/1966 | Wolf . |
| 3,319,684 | 5/1967 | Calhoun . |
| 3,376,994 | 4/1968 | Flinn, Jr. . |
| 3,544,021 | 12/1970 | Wilson et al. . |
| 3,628,215 | 12/1971 | Everburg . |
| 3,629,901 | 12/1971 | Wolf et al. . |
| 3,741,447 | 6/1973 | Miles et al. . |
| 3,933,271 | 1/1976 | McGhie . |
| 4,014,292 | 3/1977 | Coughlin et al. . |
| 4,029,244 | 6/1977 | Roberts . |
| 4,158,902 | 6/1979 | Chernack et al. . |
| 4,170,313 | 10/1979 | Caves et al. . |
| 4,181,236 | 1/1980 | Prodel . |
| 4,189,056 | 2/1980 | Majewski . |
| 4,226,348 | 10/1980 | Dottor et al. . |
| 4,300,695 | 11/1981 | Hsu . |
| 4,305,519 | 12/1981 | Gerich . |
| 4,351,555 | 9/1982 | Hashimoto . |
| 4,358,035 | 11/1982 | Heidecker . |

(List continued on next page.)

FOREIGN PATENT DOCUMENTS

| | | |
|---|---|---|
| 1584029 | 4/1970 | (DE) . |
| 3321000 | 12/1984 | (DE) . |
| 4015556 | 11/1990 | (DE) . |
| 1056999 | 2/1967 | (GB) . |
| 1180411 | 2/1970 | (GB) . |
| 2274832 | 8/1994 | (GB) . |

*Primary Examiner*—Allan N. Shoap
*Assistant Examiner*—Joe Merek
(74) *Attorney, Agent, or Firm*—Foley & Lardner

(57) ABSTRACT

A storage system in which a base is preferably molded of a lightweight polymeric material and includes a peripheral raised edge for hingedly receiving front, rear, and end walls. The end walls of one embodiment are foldable, such that they collapse integrally with the front and rear walls. Each of the front, rear and end walls can be folded flat for compact storage of the system.

5 Claims, 9 Drawing Sheets

U.S. PATENT DOCUMENTS

| | | |
|---|---|---|
| 4,403,712 | 9/1983 | Wiesinger . |
| 4,540,213 | 9/1985 | Herlitz et al. . |
| 4,615,462 | 10/1986 | Sacherer et al. . |
| 4,693,386 | 9/1987 | Hughes et al. . |
| 4,718,584 | 1/1988 | Schoeny . |
| 4,960,223 | 10/1990 | Chiang et al. . |
| 4,964,528 | 10/1990 | Wagoner . |
| 4,982,866 | 1/1991 | Krawagna . |
| 5,025,964 | 6/1991 | Phrippidis . |
| 5,054,668 | 10/1991 | Ricchiuti . |
| 5,094,375 | 3/1992 | Wright . |
| 5,129,612 | 7/1992 | Beaupre . |
| 5,161,700 | 11/1992 | Stannis et al. . |
| 5,161,709 | 11/1992 | Oestreich, Jr. . |
| 5,167,433 | 12/1992 | Ryan . |
| 5,193,706 | 3/1993 | Hanna et al. . |
| 5,289,941 | 3/1994 | Blakenburg et al. . |
| 5,347,746 | 9/1994 | Letson . |
| 5,381,940 | 1/1995 | Wright . |
| 5,392,972 | 2/1995 | Caruso et al. . |
| 5,398,334 | 3/1995 | Umiker . |
| 5,419,602 | 5/1995 | VanHoose . |
| 5,484,091 | 1/1996 | Malinowski et al. . |
| 5,501,384 | 3/1996 | Wisniewski . |
| 5,515,987 | 5/1996 | Jacques et al. . |
| 5,535,931 | 7/1996 | Barlow et al. . |
| 5,538,148 | 7/1996 | Indyk . |
| 5,547,091 | 8/1996 | Neveras et al. . |
| 5,676,254 * | 10/1997 | Cheng et al. ................ 206/751 |
| 6,032,815 * | 3/2000 | Elstone ................ 220/6 |

\* cited by examiner

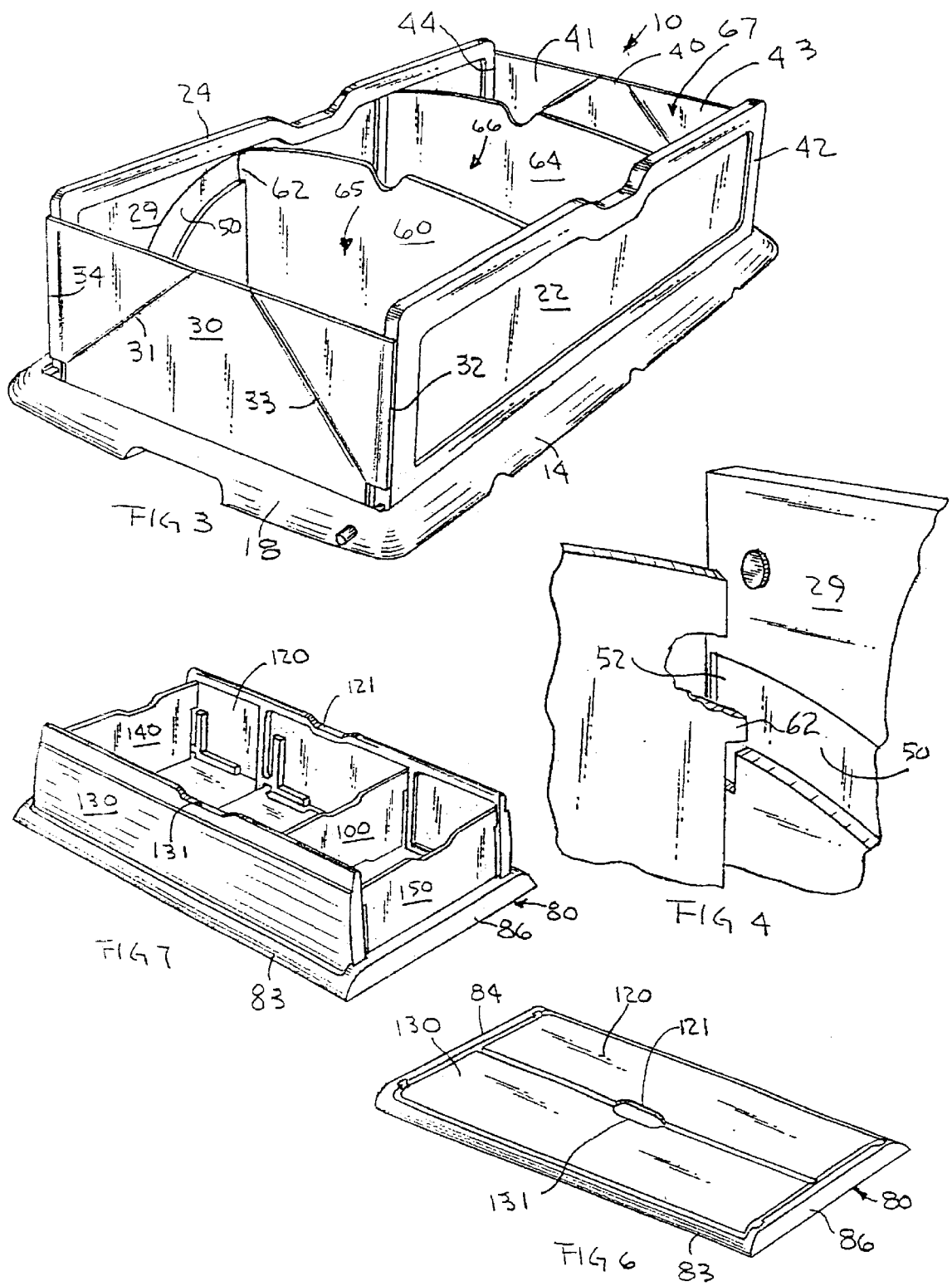

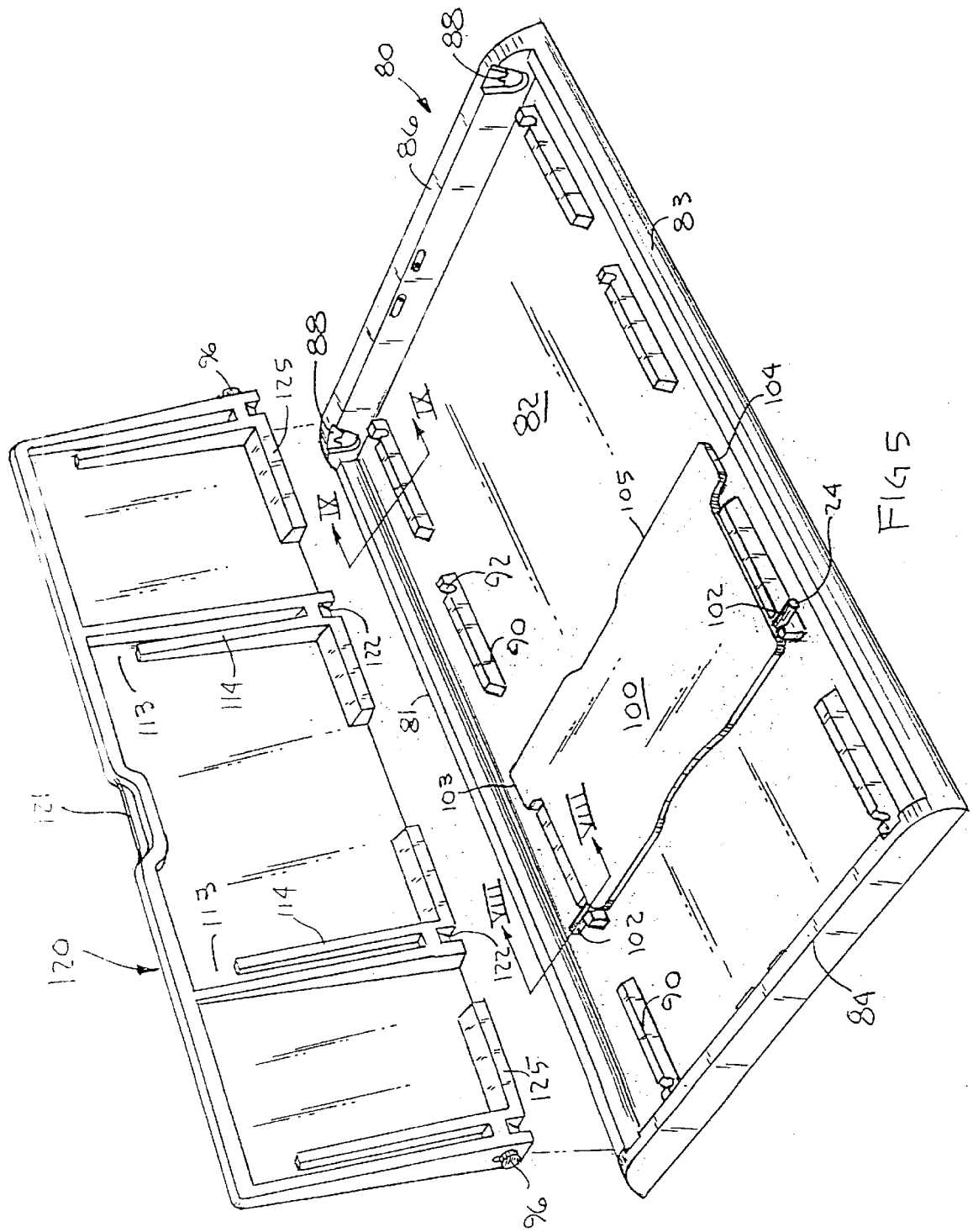

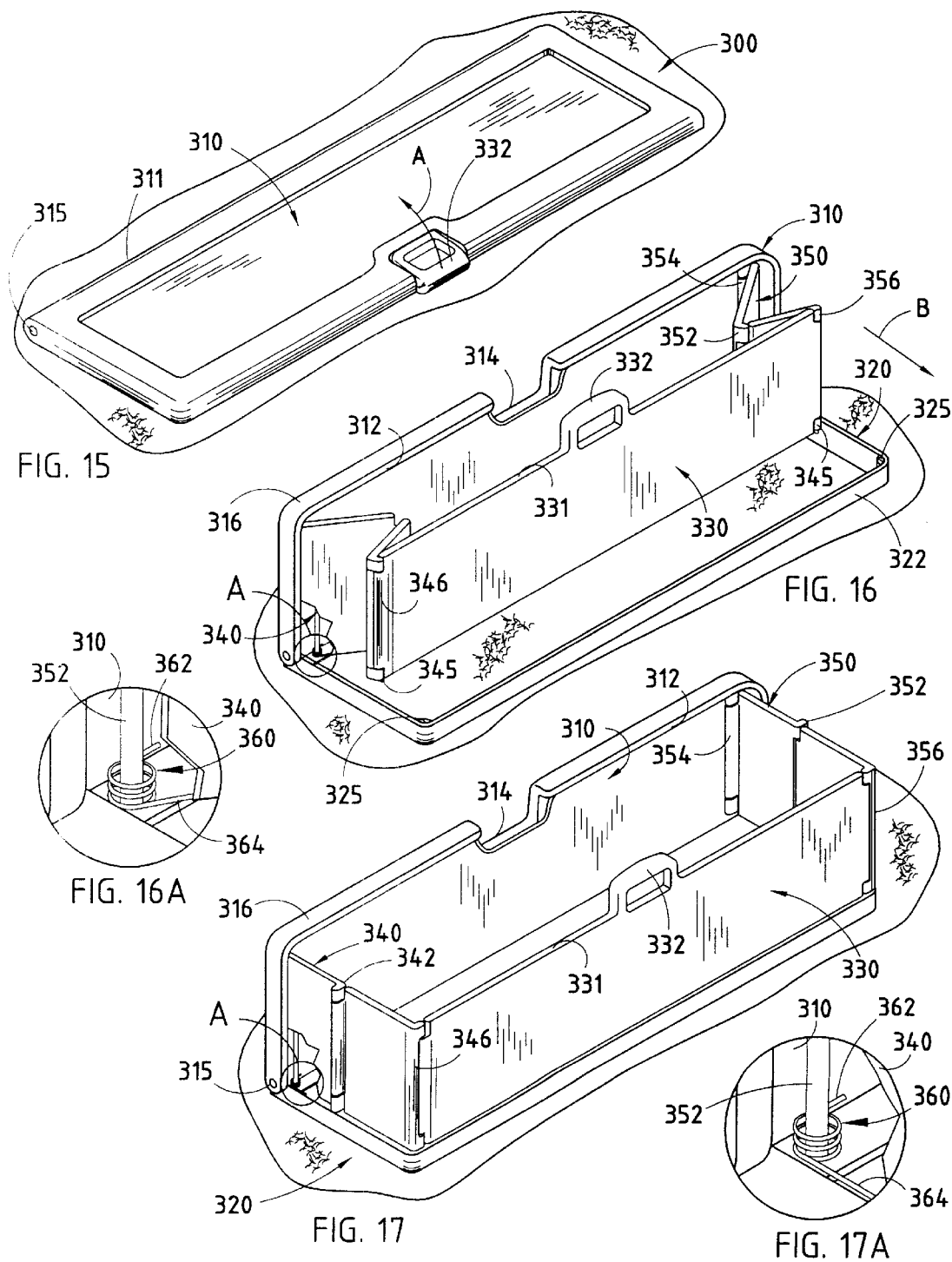

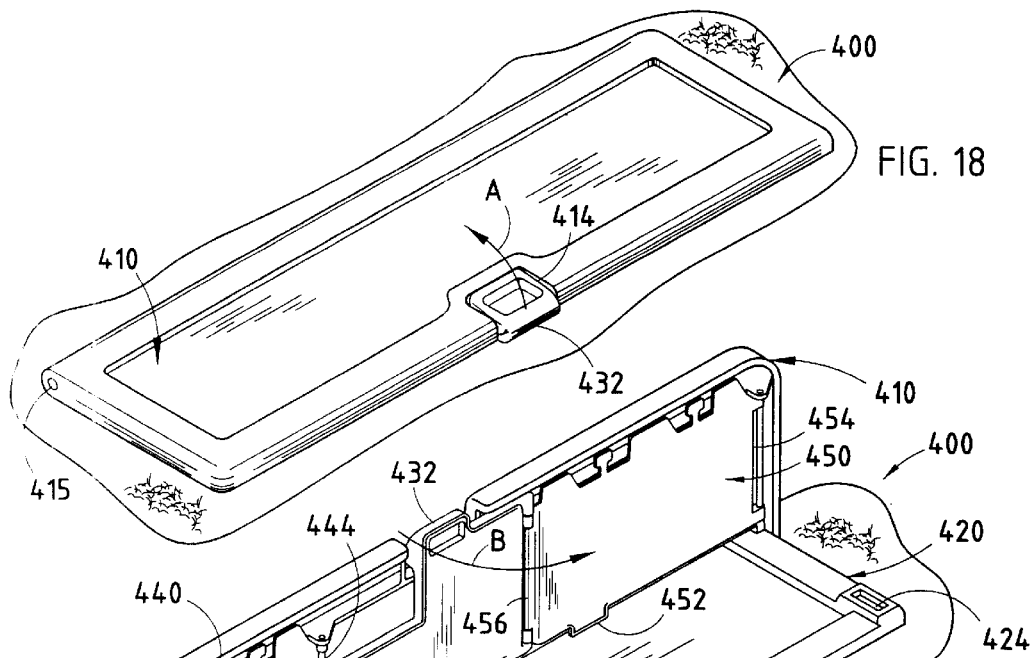
FIG. 18
FIG. 19
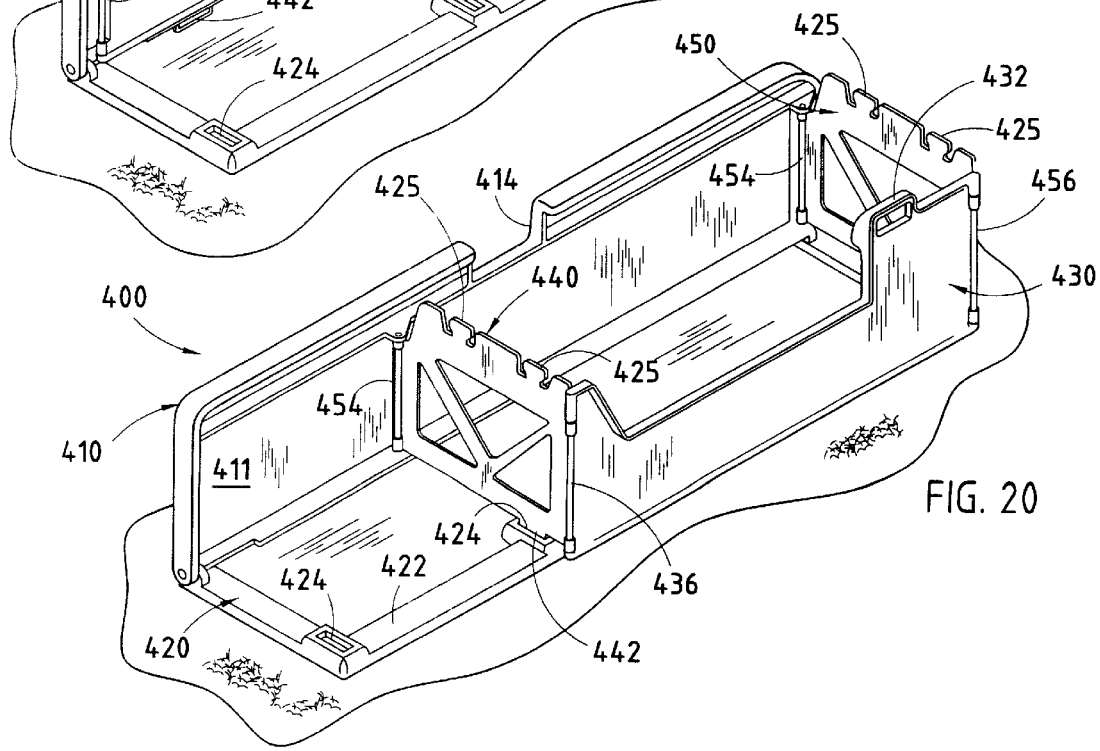
FIG. 20

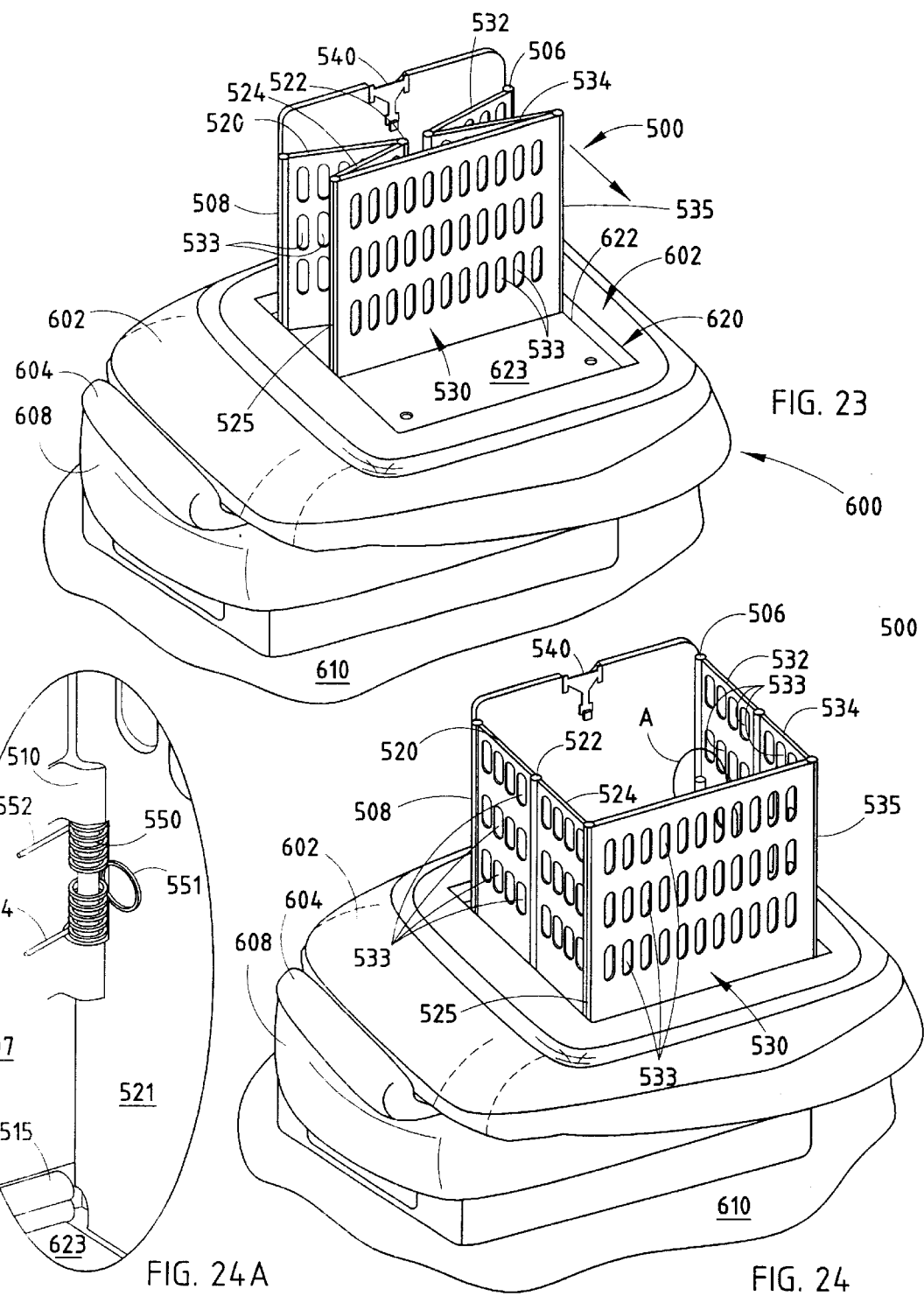

STORAGE DIVIDER

CROSS REFERENCE TO RELATED APPLICATION

This application is a continuation-in-part of application Ser. No. 08/814,653 filed Mar. 11, 1997, entitled TRUNK STORAGE DIVIDER.

BACKGROUND OF THE INVENTION

The present invention relates to a collapsible trunk storage system by which the trunk or rear area of a vehicle can be conveniently divided into separate storage areas.

With the recent popularity of mini vans, vans, hatchbacks and other vehicles which have a relatively flat trunk area with little confinement of packages placed therein, there exists a need for a system by which, when needed, provides individual storage areas for segregating and supporting items such as grocery bags and the like and yet, when not needed, can be folded flat, occupying little space, so that the storage device need not be removed from the vehicle. Several relatively complicated, interlocking storage devices have been proposed including those of U.S. Pat. Nos. 4,226,348; 4,718,584; 5,025,964; 5,161,700; and 5,535,931. Although these storage devices serve to provide segregation and support for individual items, they tend to be somewhat complicated, expensive and are not easily converted between stored and use positions. Thus, there exists a need for an inexpensive, durable, easy-to-use and compact storage system for dividing the rear storage area of vehicles for the convenience of the user as well as facilitating the support of items during transit.

SUMMARY OF THE PRESENT INVENTION

The system of the present invention provides a storage divider in which a frame or base, preferably molded of a lightweight polymeric material, defines a support platform for receiving front, rear and end walls and intermediate partitions. The end walls of one embodiment are made of a foldable material, such that they collapse for storage. The partitions pivotally snap-fit into the base and interlock with the front and rear walls for use. Each of the front, rear and end walls, as well as the partitions, are folded flat for compact storage of the divider unit.

These and other features, objects and advantages of the present invention will become apparent upon reading the following description thereof together with reference to the accompanying drawings.

BRIEF DESCRIPTION OF THE DRAWINGS

FIG. 3 is a perspective view of the structure shown in FIGS. 1 and 2, shown in an open or use position with partitions extended for dividing the storage area into three separate areas;

FIG. 4 is an enlarged perspective view of one of the arcuate tracks and locking slots for the partitions of the structure shown in FIGS. 1–3;

FIG. 5 is a fragmentary perspective partially exploded view of an alternative embodiment of the present invention;

FIG. 6 is a perspective view of the structure shown in FIG. 5 in its assembled and stored position;

FIG. 7 is a perspective view of the structure shown in FIGS. 5 and 6, shown in its open, use position;

FIG. 15 is a fragmentary perspective view of an alternative embodiment of a storage divider used in a vehicle, shown in a first position;

FIG. 16 is a fragmentary perspective view, partly broken away, of the structure shown in FIG. 15, shown in a partially open position;

FIG. 16A is an enlarged fragmentary perspective view of the circled area A in FIG. 16;

FIG. 17 is a fragmentary perspective view of the structure shown in FIGS. 15 and 16, shown in a fully open position;

FIG. 17A is an enlarged fragmentary perspective view of the circled area A of FIG. 17;

FIG. 18 is a fragmentary perspective view of yet another alternative embodiment of the invention, shown in a first or stored position;

FIG. 19 is a fragmentary perspective view of the structure shown in FIG. 18, shown in a partially open position;

FIG. 20 is a fragmentary perspective view of the structure shown in FIGS. 18 and 19, shown in a fully open use position;

FIG. 23 is a perspective view of the structure shown in FIGS. 21 and 22, shown with the storage unit in a partially open position;

FIG. 24 is a perspective view of the structure shown in FIG. 23, shown in the fully expanded use position; and FIG. 25 is an enlarged fragmentary perspective view of a section of the storage unit shown in FIGS. 21–24.

DETAILED DESCRIPTION OF THE PREFERRED EMBODIMENT

Figure 1:
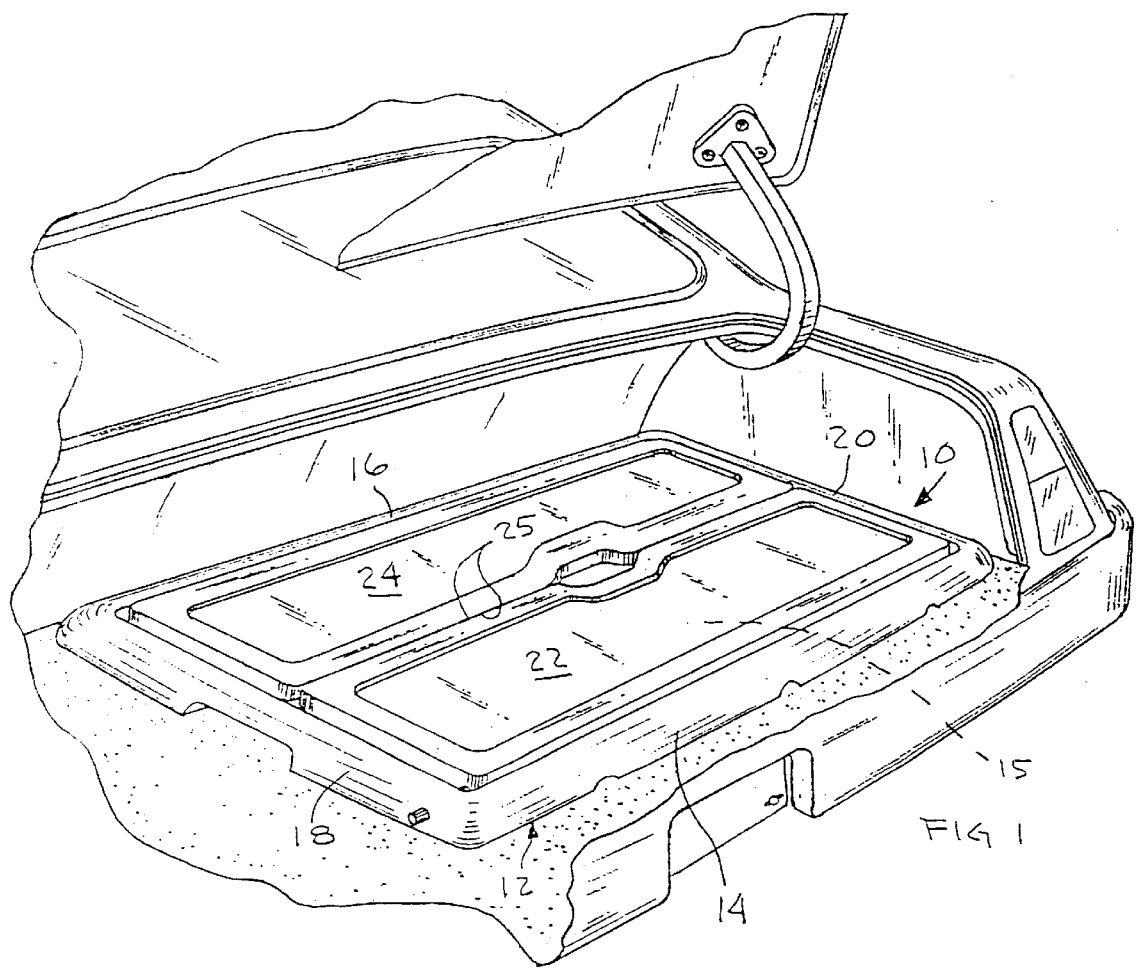
FIG. 1 is a perspective view of the first embodiment of the present invention shown in a collapsed, stored position.
Figure 2:
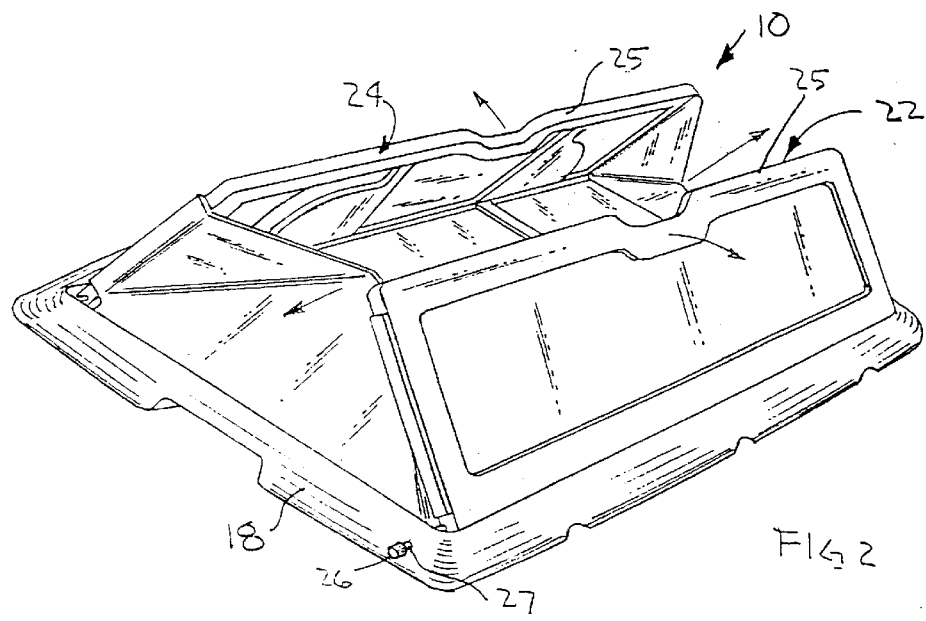
FIG. 2 is a perspective view of the structure shown in FIG. 1, shown in a partially open position.

Referring initially to FIGS. 1–3, there is shown a collapsible storage unit 10 of the present invention, which is adapted for use in a flat storage area of a vehicle 11, such as the rear storage area of a van, hatchback or in the trunk of a more conventional automobile. The collapsible storage system 10 comprises a generally rectangular base 12 defined by a rectangular peripheral raised lip defined by a rear (relative to the vehicle) edge 14, a front edge 16 and sides 18, 20, integrally formed with a floor 15 extending between the raised edges. Base 12 can be integrally injection molded, blow-molded, or otherwise molded of a suitable polymeric material, such as polyvinyl chloride or the like, with the raised edges being hollow. The base may comprise a rectangular frame with or without a center section. Pivotally mounted to the edges are molded polymeric front and rear walls 24 and 22 having a width slightly less than that of the base so that they collapse within the raised edges of the base to a relatively flat position adjacent the floor of the base when collapsed, as seen in FIG. 1. The height of walls 22 and 24 are substantially equal to half the depth of the base so that the top edges 25 lay adjacent one another when collapsed, as seen in FIG. 1. The lower edges of each of the front and rear walls are pivotally mounted through the edges 18 and 20, respectively, of base 12 by means of pivot pins 26 at each of the corners of the base. Pivot pin 26 on one end can be integral with the reinforced lower edge of each of the walls 22 and 24 and inserted through an aperture in edges 18 or 20. The remaining corners of walls 22 and 24 include an aperture for receiving pin 26 (FIG. 2), which extends into an aperture 27 in edge 18 of base 12, for pivotally holding the walls in position. Coupled to the outer vertically extending edges of the front and rear walls 24 and 22, respectively, are collapsible end walls 30 and 40, which in the preferred embodiment comprise fabric which is coupled by suitable bonding adhesives along their edges 32, 34 and 42, 44, respectively, to the ends of front and rear walls 24 and 22. The fabric can be relatively heavy weight and include diagonal fold lines 31 and 33 in wall 30 and similar fold lines 41 and 43 in end wall 40 such that when partially collapsed, as shown in FIG. 2, the end walls fold flat under the front and rear walls 24 and 22.

The inner surfaces 29 and 28 of the front and rear walls 24 and 22, respectively, include arcuate slots 50 which extend from near the floor of base 12 in an arc of approximately 90° and terminate in a notch 52 (FIG. 4) for lockably receiving a tab 62 extending from near the top of each of the partition walls 60 or 64 pivotally mounted to the floor utilizing pivot pins extending through the front and rear edges 16 and 14, respectively. Thus, the partition walls 60 and 64 are guidably held between walls 22 and 24 by tabs 62 which ride within arcuate slots 50 and snap-lock into a raised vertical position, as seen in FIG. 3, with tabs 62 engaging notches 52. Walls 22 and 24 can also be blow-molded such that they have an outer surface and an inner surface in which the arcuate recesses 50 are formed.

The entire assembly of the FIGS. 1–4 embodiment can be extremely lightweight and is moved from a closed position, shown in FIG. 1, by opening the front and rear walls, as illustrated in FIG. 2, to a fully open position, as shown in FIG. 3, which automatically expands end walls 30 and 40. Next, the partitions 60 and 64 are extended with their tabs 62 riding through the arcuate guide slots 50 until the partitions snap-lock, thus holding the flexible sidewalls 30 and 40 in a taught, vertically extending position and dividing the collapsible storage system into three separate storage bins 65, 66 and 67. The storage system shown in FIGS. 1–4 is dimensioned such that each of the storage bins can hold up to three standard paper grocery bags in front to back relationship, although as can be appreciated, the dimensions can be varied as desired for carrying a greater or lesser number of items. Preferably, the base 12 is selected, as are the walls, for a given vehicle model such that the storage space in the rear of the vehicle is fully utilized. Partitions 60 and 64 are rigid and made of a polymeric material, such as ABS, and are shaped to add stiffness and rigidity to the divider unit when opened to its use position, as shown in FIG. 3.

In the embodiment shown in FIGS. 5–9, a somewhat similar structure is disclosed in which a molded frame defining a base 80 is provided and includes a raised peripheral border defining edges for the floor 82. The edges include a front edge 81, a rear edge 83 and sides 84 and 86. Extending upwardly at spaced locations inwardly from front and rear edges 81 and 83 are mounting bosses 90, each of which are integrally molded with the base 80 and each of which include a socket 92 for pivotally receiving snap-in axles 102 of divider panels 100. The mounting bosses 90 are aligned in pairs adjacent but spaced from the front and rear edges 81 and 83 of the base for snap-receiving divider panels 100. Divider panels 100 include a pair of stub axles 102 which extend within snap-in sockets 92 and pivotally mount the dividers to the base 80. The dividers 100 are somewhat T-shaped with upper flanges 103, 104 along the top edges 105 thereof for nesting between mounting bosses 90, as illustrated in FIG. 5, and for engaging slots 113 in the front pivoted wall 120 and a similar slot formed in the rear wall 130 (FIG. 6). Each of the panels 130 and 120 forming the front and rear walls of the storage container, as seen in FIG. 7, include recessed areas 131, 121 defining a handle for easily raising the front and rear walls for movement of the storage container from its flat stored position, shown in FIG. 6, to the raised use position, shown in FIG. 7.

Figures 8, 9:
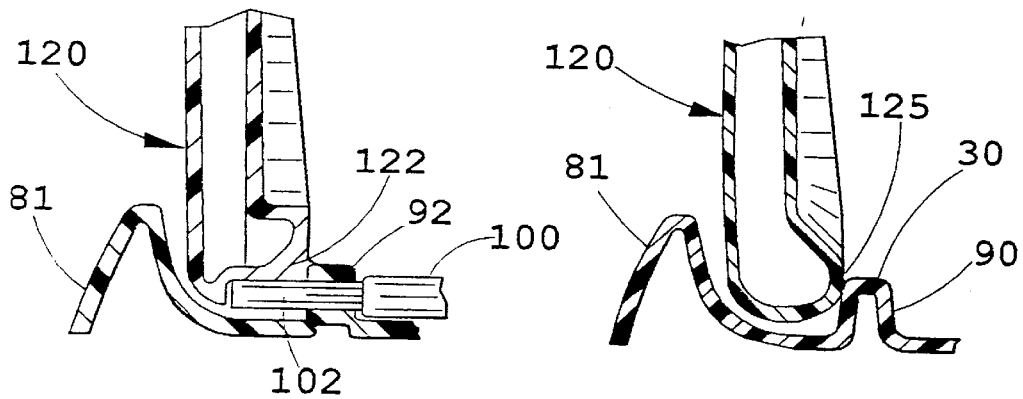
FIG. 8 is an enlarged fragmentary cross-sectional view of the interconnection of one of the walls and the dividers taken along section line VIII—VIII of FIG. 5 when the structure is assembled.
FIG. 9 is an enlarged fragmentary perspective view of the interface between the cover and base taken along section lines IX—IX of FIG. 1 when the structure is assembled.

The inside corners of sides 84 and 86 of base 80 include sockets 88 at each of the four corners of the base for snap-receiving a stub pivot axle 96 at the opposite corners of each of the front and rear walls 120, 130. The bottom edge of the front and rear panels 120, 130, respectively, include slots 122 which extend over the axles 102 of each of the dividers 100 for locking the dividers in place, as best seen in FIG. 8, when the front and rear walls are snap-locked to the base 80. This retains the dividers 100 in position while allowing them to pivot between the stored flat position, as seen in FIG. 5, to a raised divided position, as seen in FIG. 7. The panels 140, 150 are of the same construction as divider 100, shown in FIG. 5, and are mounted at opposite ends of the base 80 to define end walls for the structure when raised to their storage position, as seen in FIG. 7. As best seen in FIGS. 5, 8 and 9, the front and rear panels 120, 130 are hollow blow-molded members which provide lightweight, low cost construction and yet provide structural rigidity to the unit. The ribs 114 (FIG. 5) provide strength as well as interlocking with the dividers 100 to provide a stable, collapsible storage platform for use in holding packages in the rear storage area of a vehicle. Each of the front and rear walls 120 and 130, respectively, include, in spaced relationship along their lower edges aligned with each of the mounting bosses 90, outwardly projecting lands 125, which, as seen in FIG. 9, engage the outer surface of the mounting bosses 90 to align the front and rear walls 120 and 130 in a generally vertically extending position. Thus, the lands 125 and mounting bosses 90 serve as interlocking stops for holding the front and rear walls 120 and 130, respectively, in a generally vertically extending orientation. In this position, the flanges 103 and 104 of each of the dividers 100 snugly snap-lock within the recesses 113 formed in the reinforcing ribs 114 of the front and rear walls. The unique snap-together, interlocking relationship of the base 80, front and rear walls 120 and 130, respectively, and dividers 100 provide an easily used system which is readily assembled and easily used.

Figure 10:
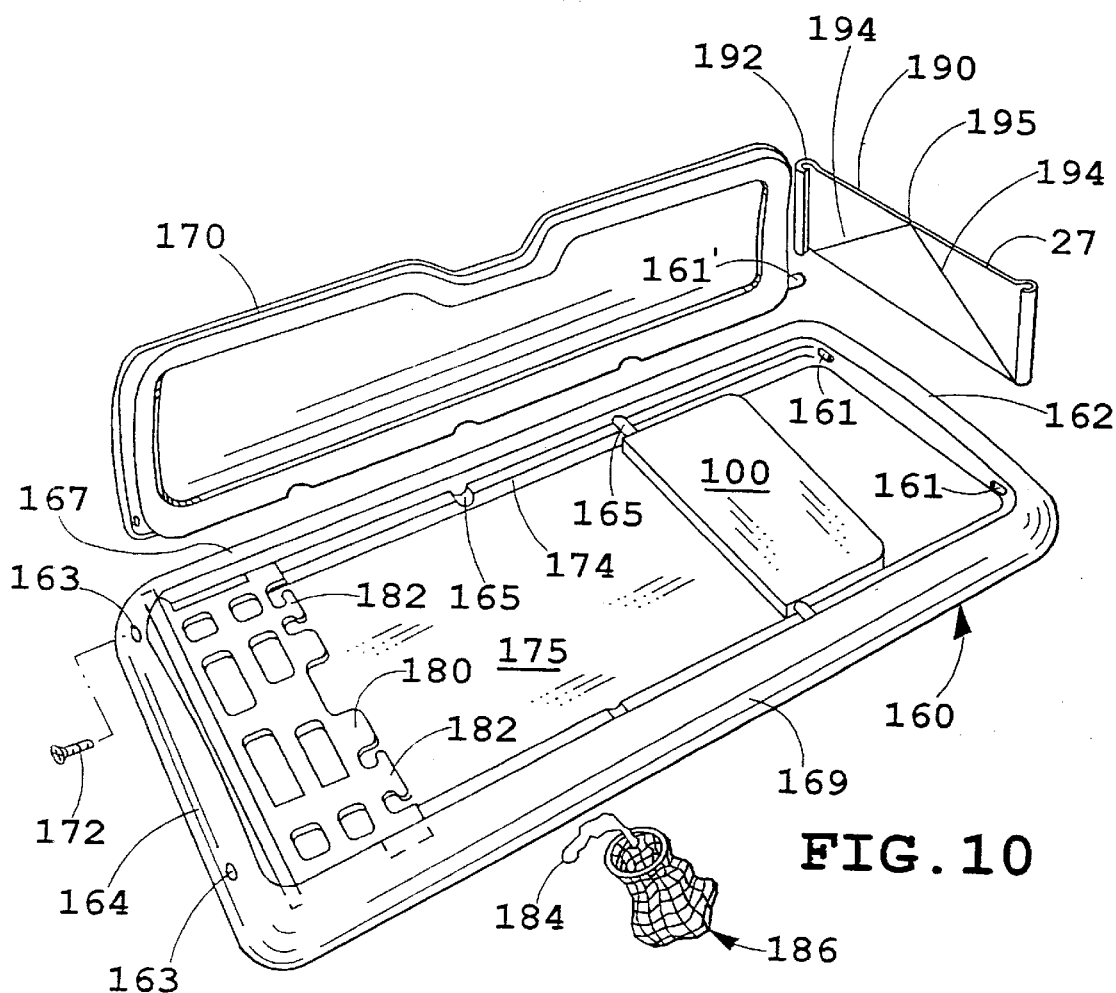
FIG. 10 is a fragmentary perspective view of yet another embodiment of the present invention, showing alternate end walls and the mounting of the front wall to the base.

FIG. 10 shows yet an alternative embodiment of the structure shown in the previous figures in which a polymeric molded frame defining a base 160 is provided with a peripheral lip defining front, rear and integral side edges. Front and rear folding walls 170 (only the front panel shown) are pivotally mounted to the base by means of an aperture 161 at opposite corners of the right edge 162 of base 160 which receives a stub axle 161' and by bolts 172, which extend through apertures 163 in edge 164 of base 160, to pivotally mount the front and rear walls 170 to the base for collapsible storage. The front and rear lips 167, 169 formed on the base 160 include slots 165 for receiving the pivot axles of snap-in dividers 100, of the same construction as dividers 100 shown in the embodiment of FIGS. 5–9, with rails 174 in which the sockets 165 are formed inset slightly from the peripheral edge of the base 160. End walls 180, 190 are likewise pivotally mounted in opposed sockets 165. The end walls may be made of a rigid polymeric material having a plurality of apertures, such as the left end wall 180, to which posts 182 may extend along the top edge thereof for receiving the drawstring 184 of a mesh bag 186 for additional storage of small items when the end wall is raised and interlocked with the front and rear walls in the same manner as disclosed in FIGS. 5–9. The end wall may also take the form of a material as illustrated by the right end wall 190 made of a fabric which can be vertically pivotally mounted to the edges of front and rear walls 170 by a pivot pin 192 and allowed to collapse by folding as the front and rear walls are moved to a closed position. For such purpose and to assist in rigidifying the fabric end wall, a pair of rigid polymeric struts 194 extending from the corners to a central apex 195 may be employed and are flexibly attached to the fabric end wall 190 to allow the fabric to fold flat in the same manner as the end wall embodiment shown in FIGS. 1–4. As in the previous embodiments, the floor 175 of base 160 is slightly recessed and protects the floor of the vehicle in the event of spillage of small amounts of liquid, which will be contained within the tray defined by the peripheral lip of the molded base.

Figure 11:
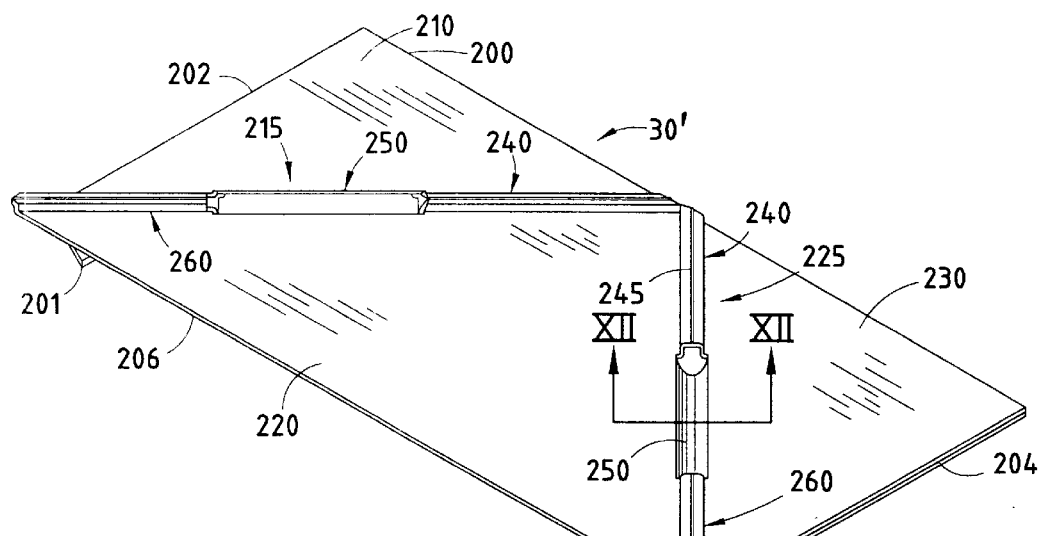
FIG. 11 is a perspective view of an alternative end wall used with the structure shown in FIGS. 1 and 2.
Figure 13:
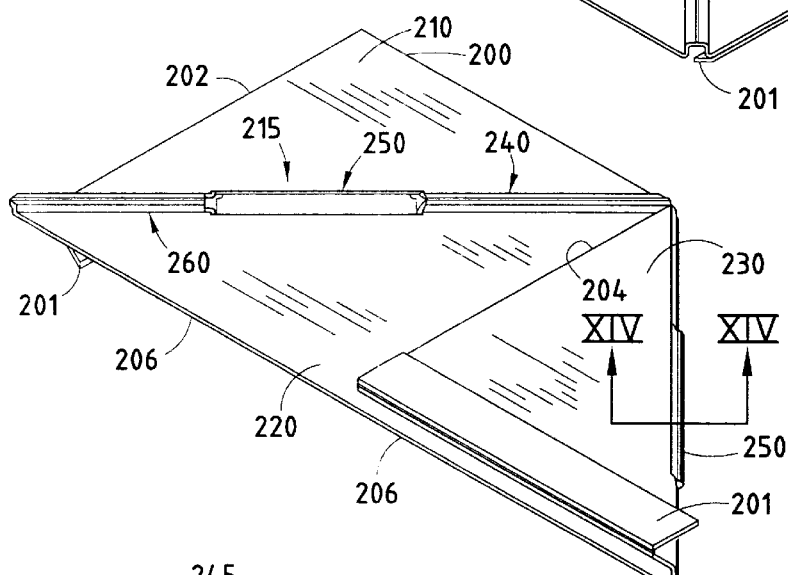
FIG. 13 is a perspective view of the structure shown in FIG. 11, showing one of the panels folded to a collapsed position.

Instead of the fabric end walls 30, 40 of the embodiment shown in FIGS. 1–4, the end walls can be made of a suitable relatively thin polymeric material, such as polypropylene, with over-center locking hinges as shown in FIGS. 11–14, which show one of the two end walls 30, 40 which are attached to the panels 22, 24 and substitute for the fabric panels 30, 40. Referring to FIGS. 11–14, one of the end panels or walls 30' is shown and is generally rectangular, including a top edge 200, a left edge 202, a right edge 204 and a bottom edge 206. Edges 202 and 204 each include an integral polymeric living hinge flap 201 which can be attached such as by welding or an adhesive to the ends of front and rear panels 22, 24, as seen in FIG. 3, with the lower edge 206 of wall 30' extending into the tray-like base of the divider. The rectangular panel 30' is made of three triangular sections 210, 220 and 230, each joined to an adjacent triangular panel by means of integrally molded over-center resilient hinges 215 and 225, respectively. The hinges extend continuously along one of the sides of the triangular panels, joining adjacent panels, as seen in FIGS. 11 and 13, with each hinge comprising three sections. These include a first generally U-shaped, integrally molded hinge 240, a centrally positioned integrally molded over-center spring 250 and a second generally U-shaped molded hinge 260 on a side of spring 250 opposite hinge 240.

Figure 12:
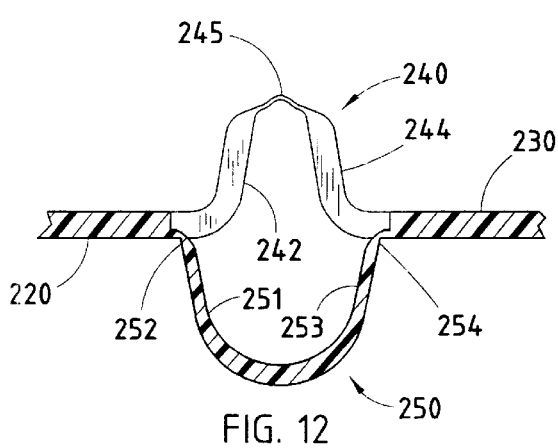
FIG. 12 is a cross-sectional view taken along section lines XII—XII of FIG. 11.
Figure 14:
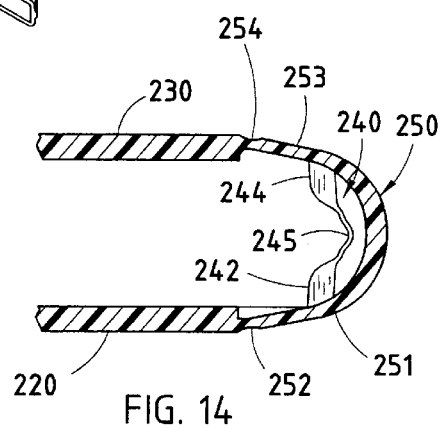
FIG. 14 is a cross-sectional view taken along section lines XIV—XIV of FIG. 13.

Hinge 240 is best seen in FIG. 12 and comprises integral legs 242 and 244 extending upwardly from each of the panels 220 and 230, respectively, joined by an integral reduced thickness living hinge 245 extending along the length of hinge 240. Hinge 260 is similarly shaped and extends from the apex of adjacent triangular panels 220 and 230 in spaced relationship to hinge 240. The spring 250 is best seen in FIGS. 12 and 14 and includes a generally U-shaped member extending in an opposite-facing direction than hinges 240 and 260 and is integrally formed with polymeric panels 220 and 230, as seen in FIGS. 12 and 14. A reduced diameter flexible living hinge 252 and 254 joins the ends of U-shaped spring 250 with panels 220 and 230, respectively.

The over-center hinges 215 and 225 allow the panels 210 and 230 to collapse over panel 220, allowing the sides 22 and 24 of the storage structure to be collapsed into the position shown in FIG. 1. In so doing, the over-center spring 250 and hinges move, as best seen in FIGS. 12 and 14, between opposed-facing relationships when snapped open with the legs 251 and 253 of spring 250 tending to hold the panels 210, 220, and 230 in planar relationship as seen in FIG. 11. When collapsed as seen with one of the panels collapsed in FIG. 13, the hinges 240 and 260 invert with legs 251 and 253 of spring 250, now compressibly holding the panels 230 and 220 in a collapsed stored position under the compressive force of legs 251, 253 tending to move toward one another once deflected away from each other. The effect of spring 250 with hinges 240 and 260 is that of an over-center spring which snaps to a stable open position shown in FIG. 12, with panels 220 and 230 being substantially coplanar to a second stable collapsed position, shown in FIGS. 13 and 14, with panels 210 and 230 partially overlying panel 220. Hinge 215 and panel 210 operate in the same manner such that panel 210 can be moved to a collapsed position with edge 202 adjacent edge 204 of panel 230 when fully collapsed. Thus, by providing folding triangular adjacent sections of polymeric panels with integrally molded living hinges and over-center springs, the divider shown in FIGS. 1 and 3 can include polymeric molded side panels which are durable, stain-resistant and assist in holding the storage unit in either a collapsed stored position or an expanded use position. Panels 301 can be made of any suitable polymeric material such as polypropylene. An alternative embodiment of the storage divider is also shown in FIGS. 15–17 and now described.

The storage unit 300 includes a generally rectangular cover panel 310, which serves also as a rear wall when pivoted to an open position, as seen in FIGS. 16 and 17. The cover is pivotally mounted to a generally rectangular frame defining a base 320 by means of pivot pins 315 on opposite corners of the edge 311 of cover 310. Cover 310 has a generally downwardly extending peripheral lip 312, which extends over and conceals base 320 when in a collapsed stored position as shown in FIG. 15. Cover 310 also has a generally rectangular cutaway 314 along edge 316 to accommodate a handle 332 extending upwardly from an edge 331 of front panel 330. Panel 330 is coupled to cover 310 by means of pivoted sidewalls 340 and 350, each having a central hinge 342 and 352, respectively, thereby dividing the panels into halves which collapse upon themselves as best seen in FIG. 16. The edges of panels 340 and 350 are hingedly mounted to cover 310 by hinges 354 and hinges 346 and 356 couple panels 340 and 350 to front panel 330. The frame 320 can be a rectangular open frame or a tray-like member having an upwardly extending peripheral lip 322 and like the remaining panels can be integrally molded of a suitable polymeric material, such as polypropylene, ABS, or the like, with the various hinges and pivot pins also being integrally molded of a polymeric material and either snap-fitted of otherwise conventionally assembled.

As seen in the detained drawings of FIGS. 16A and 17A, a coil kick-out spring 360 surrounds at least one of the hinge pins for the hinges 354 extending between the cover 310 and sidewall panels 340 and 350. Spring 360 includes one leg 362 engaging the inside of cover 310 and an opposite leg 364 which engages the inner surface of panel 340 such that, as the cover 310 is raised, each of the kick-out springs 360 surrounding the hinge pins 352 of the sidewalls tend to urge the storage unit from the position shown in FIG. 16 to the fully expanded position shown in FIG. 17 in which the compression coil spring 360, and particularly leg 364 thereof, has uncoiled approximately 90° to urge and hold the storage unit in an open position.

In operation, the handle 332 is grasped by the operator and raised such that the cover 310 can be raised to an initially extended position, as shown in FIG. 16, in a direction indicated by arrow A in FIG. 15. Subsequently, front cover panel 330 is urged outwardly, in the direction indicated by arrow B in FIG. 16, by the kick-out springs 360 opening the collapsed sidewalls 340, 350 into the use position shown in FIG. 17. The front wall includes posts 345 at its lowermost corners and the base includes a frame having sockets 325 for receiving posts such that the storage divider can be locked in an open position for use. Hinges 342 and 352 can be integrally molded over-center hinges such as taught in FIGS. 12 and 14 to facilitate the locking open and closed position of the storage unit 300 if so desired.

Yet a further embodiment of the invention is shown in FIGS. 18–20 in which a storage unit 400 includes a cover panel 410 which is pivotally mounted to a base 420 by means of pivot pins 415 extending between the corners of cover 410 and base 420. The cover includes a rectangular notch 414 allowing a handle 432 of a front panel 430 to extend therein for opening and operating the storage unit as described in greater detail below. The base 420 may be defined by an open rectangular frame but preferably includes an upwardly extending peripheral rectangular lip 422 defining a tray for containing any spillage which may occur when transporting materials in a vehicle. Also, the peripheral lip 422 includes a plurality of rectangular sockets 424 for receiving downwardly extending posts 442 of a first sidewall 440 and a similar post 452 of the second sidewall 450. Sidewalls 440 and 450, as seen in FIG. 20, are hingedly mounted to cover 402 by means of hinges 454 such that the walls can pivot with respect to the inner side 411 of cover 410. Similarly, the forward edge of side panels 440 and 450 are hingedly coupled to front wall 430 by means of hinges 436 and 456, respectively, which extend generally vertically as seen best seen in FIGS. 19 and 20. Each of the side panels 440, 450 include a plurality of spaced-apart posts 425 which can be employed for holding storage bags such as bag 186 shown in FIG. 10, with the drawstring 184 extending over the posts and being held by the generally T-shaped posts for storgae of additional loose items if desired.

The storage unit 400 is moved from its collapsed stored position, shown in FIG. 18, by raising handle 432 upwardly, as indicated by arrow A in FIG. 18, until it reaches the position with cover 410, sides 440 and 450 and front wall 430 being substantially vertical with respect to base 420, as seen in FIG. 19. In this position, front wall 430 is adjacent and overlies panel 440 which, together with panel 450 and cover 410, forms a parallelogram which pivots between the position shown in FIG. 19 in a direction indicated by arrow B in FIG. 19 to an expanded use position shown in FIG. 20. The hinge pins for the hinges 436, 454 and 456 may be spring-loaded by the use of kick-out springs such as the springs 360 shown in the embodiment of FIGS. 15–17. In its use position, tabs 442 and 452 are positioned within rectangular receiving sockets 424 in the peripheral lip 422 of base 420 to lock the structure in the use position. The hinge connection 415 between cover 410 and base 420 permits sufficient clearance for the tabs 442 and 452 to be raised above sockets 424 and subsequently lowered therein.

Thus, with the storage unit 400 shown in FIGS. 18–20, handle 432 is raised, raising the entire wall structure and subsequently drawn outwardly toward the user for expanding the parallelogram formed by the corner hinged panels and locking them to the base as seen in FIG. 20. The panels can be individually molded of a suitable polymeric material, such as polypropylene, ABS or the like, with either integral snap-in hinges or separate metal hinge pins as can be conventionally fabricated. In this embodiment, the front panel 430 has a width substantially less than the overall width of either the cover 410 or base 420. In a preferred embodiment, the width of front panel 430 was approximately two-thirds that of the cover or base with the end walls 440 and 450 being substantially one-third, such that when the front cover is collapsed to the stored position within the cover 410, as seen in FIG. 19, the combined width of front panel 430 and side panel 450 substantially covers the width of the cover but fits within the peripheral lip 412 of cover 410.

Figure 21:
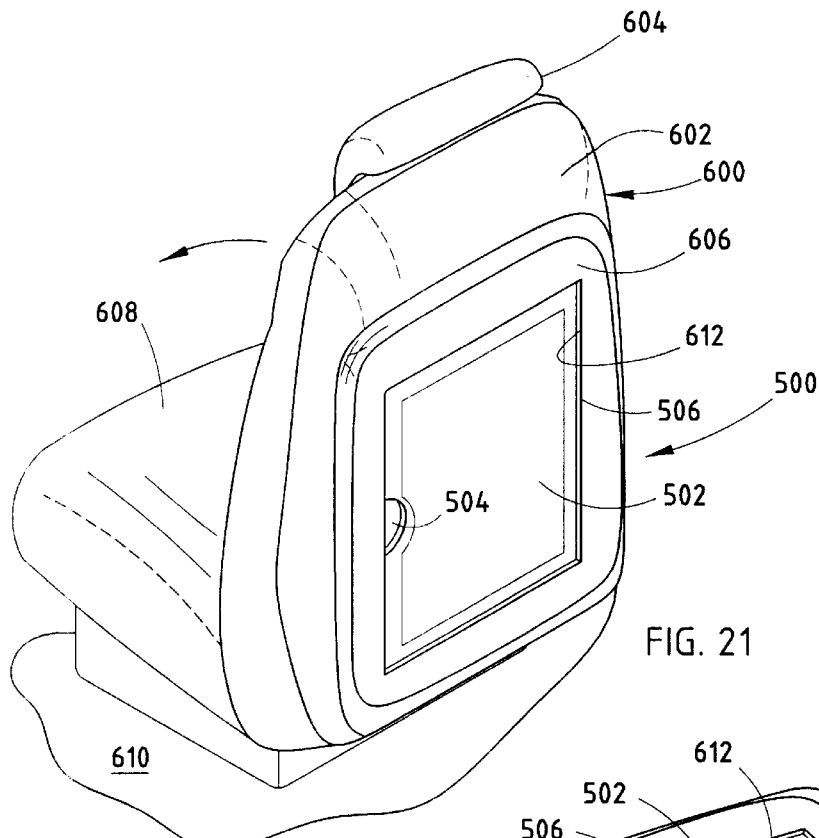
FIG. 21 is a perspective view of an alternative embodiment of a storage unit of the present invention, shown in a stored position.
Figure 22:
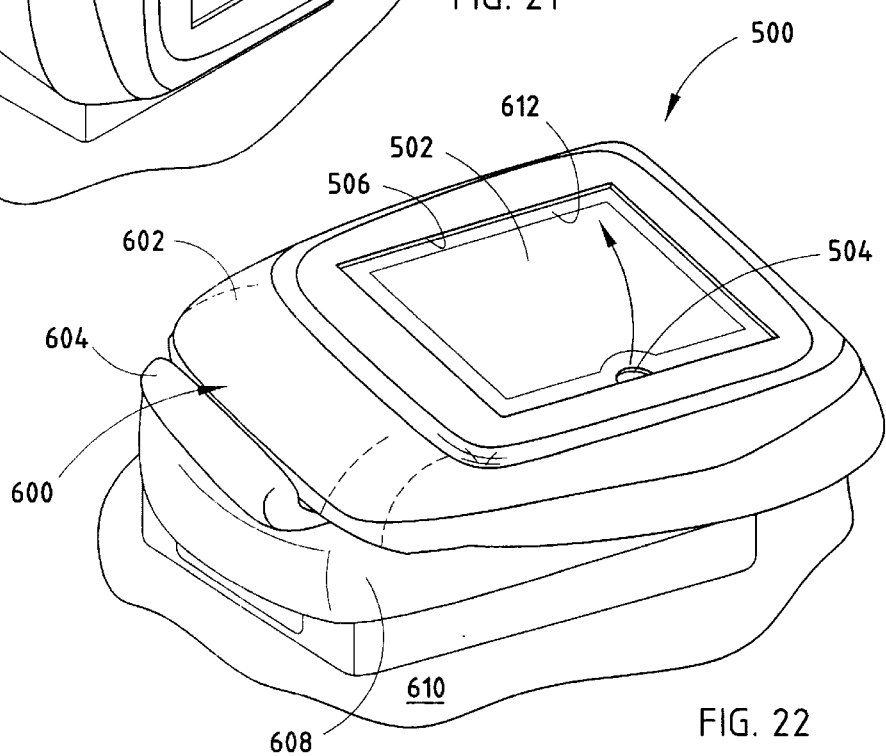
FIG. 22 is a perspective view of the structure shown in FIG. 21, shown with the storage unit in a position for opening from the stored position to a use position.

In yet another embodiment shown in FIGS. 21–25, a storage unit 500 is shown which is structurally similar to the embodiment shown in FIGS. 15–16 but it is integrated into the back of a reclinable seat back. As illustrated in FIG. 21, there is shown, mounted in a vehicle such as an automobile or van, a seat assembly 600 including a seat back 602 with an adjustable headrest 604 mounted thereon and a seat 608 coupled to a conventional seat-supporting frame mounted to the floor 610 of the vehicle. The seat back 602 and seat 608 are intercoupled by a conventional mechanism which allows the seat back to tilt from the vertically upright position shown in FIG. 21 to a substantially horizontal flat position in the vehicle as illustrated in FIG. 22. Integrated within the back 602 of seat assembly 600 is a storage unit 500 which includes a cover panel 502 forming, as described below, one wall of the storage unit once expanded from the stored position shown in FIGS. 21 and 22 to the use position shown in FIG. 24. Panel 502 includes a notch 504 allowing the panel to be gripped for opening. The storage unit 500 is mounted within a frame 606 with hinges 515 (FIG. 25) coupling one edge 506 of panel 502 to the edge of a rectangular aperture 612 (FIG. 21) of frame 606 such that panel 502 can be moved from a closed, substantially flush position with the rear surface of seat back 602, as seen in FIGS. 21 and 22, to an orthogonal position raised from the seat back, as shown in FIGS. 23 and 24.

The frame 606 defines a peripheral or generally rectangular ledge 620, as best seen in FIG. 23, defining a recessed tray 622 having a floor 623 in the center portion of the frame for nestably receiving the storage unit 500, as best seen in FIGS. 21 and 22. Panel 502 is raised to a position generally orthogonal to the stored position for the extension of the remaining walls defining the storage unit 500. Coupled to one edge 508 of panel 502 by pivot hinges such as hinge 510 (FIG. 25) is a first panel 520, which has an edge 522 coupled to a second panel 524 by hinges allowing the panels 520 and 524 to collapse for storage and open for use, as seen in FIGS. 23 and 24. The edge of panel 524 remote from panel 520 is coupled to a front panel 530 substantially coplanar with and opposite panel 502 by hinges 525 extending along the adjoining edges of panels 524 and 530. On the opposite edge 509 of panel 502, a similar pivotal connection of a pair of side panels 532 and 534 are provided and pivotally couple to the opposite edge 535 of front panel 530 by means of hinges 525 (FIG. 24). A latching assembly 540 is mounted to the inside of panel 502 as seen in FIG. 24. Latch assembly 540 can be of generally conventional construction to hold the storage unit in a stored position within the seat back frame 606, as best seen in FIG. 21, so that it can only be extended when desired.

As seen in FIG. 25, the hinges 510 extending between the sidewall panels 520, 532 and panel 502 are spring-loaded utilizing a kick-out bias spring 550 with legs 552 and 554 engaging the inside surface 507 of panel 502 and a center loop section 551 engaging the inside surface 521 of panel 520. A similar spring or springs are also employed in connection with the remaining panel 532 coupled to panel 502 and as necessary with additional hinge connections between the panels to provide snap-open control of the storage unit once raised from the stored position shown in FIG. 22 to the partially open position in FIG. 23 to assist in the extension of the storage unit for use in the position shown in FIG. 24. The tray 622 has a floor 623 which supports objects placed within the open storage container 500 when in the use position shown in FIG. 24. Panels 520, 524, 532, 534, and 535 include a plurality of spaced apertures 533 formed in an array to reduce the weight and cost of the storage unit 500 as well as provide convenient edges for hooking hold-down straps or the like to the panels. Thus, with the embodiment shown in FIGS. 21–25, a collapsible storage unit is conveniently located in the seat back to provide additional usable storage space when the seat is not being used for seating.

It will become apparent to those skilled in the art that various modifications to the preferred embodiments of the invention as described herein can be made without departing from the spirit or scope of the invention as defined by the appended claims.

What is claimed is:

1. A storage divider comprising:

a base;

a cover hingedly mounted to said base for movement between a stored position substantially parallel and overlying said base and a use position rotated substantially orthogonal to said base;

a pair of collapsible sidewalls pivotally coupled to said cover; and a front wall pivotally coupled to said collapsible sidewalls and having a handle extending above a top edge of the front wall such that said front wall and said sidewalls can be moved between a position substantially flush and adjacent an inner surface of said cover to an extended position substantially remote from said cover and extending away from said base wherein said handle fits within an opening in said cover when said cover is in said stored position.

2. The storage divider as defined in claim 1 wherein said base comprises a rectangular frame.

3. The storage divider as defined in claim 1 wherein said sidewalls comprise a pair of rectangular panels hingedly joined at their center for collapsing from a substantially planar position to a substantially overlying position.

4. The storage divider as defined in claim 3 and further including at least one kick-out spring for urging said sidewalls toward said extended position.

5. The storage divider as defined in claim 3 wherein said front wall includes posts at its lowermost corners and said base includes a frame having sockets for receiving posts such that said storage divider can be locked in an open position for use.

\* \* \* \* \*